Jan. 15, 1924.
G. C. STROUSE
1,481,075
PENDULUM DEMONSTRATING APPARATUS
Filed March 14, 1923
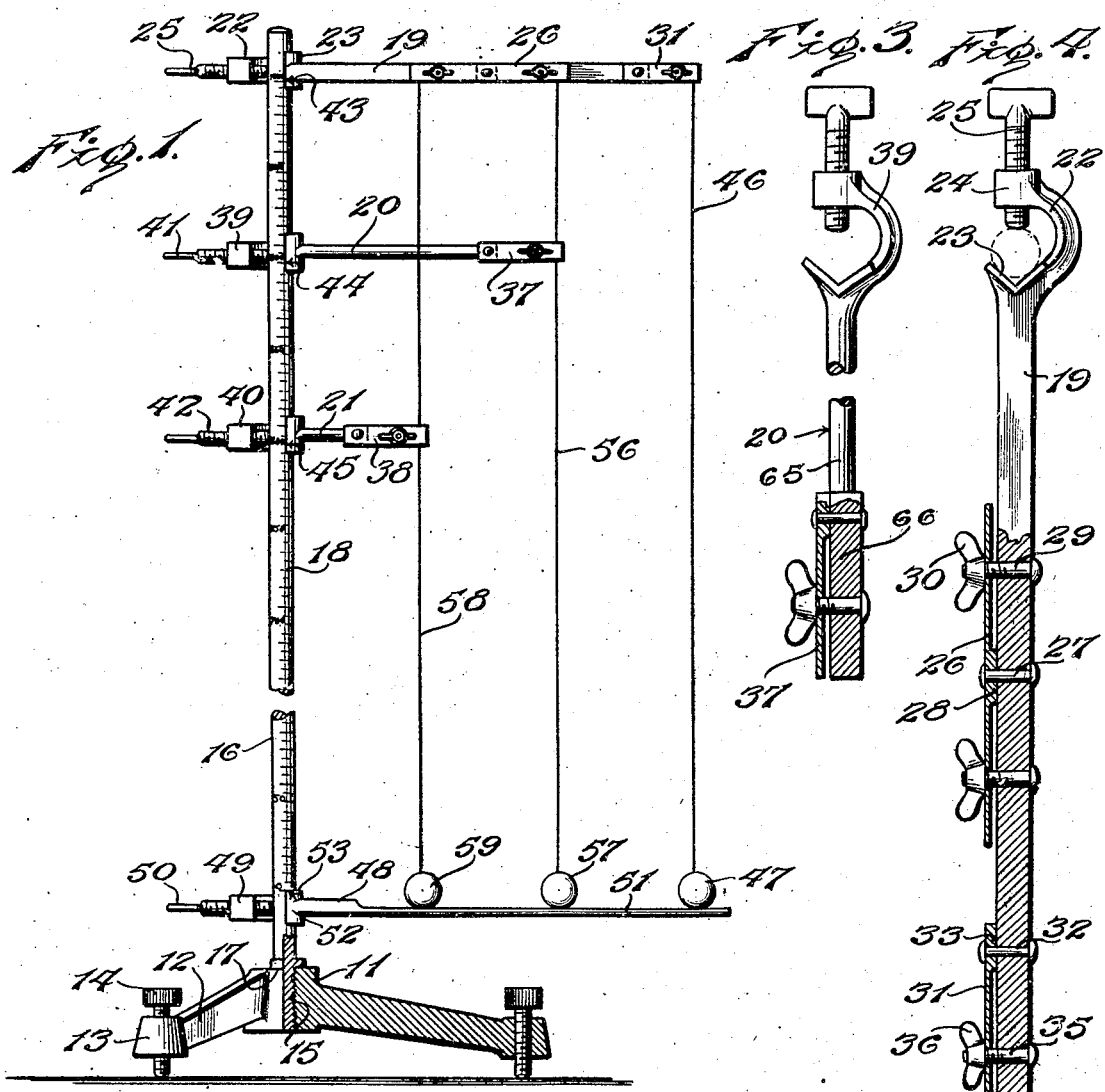
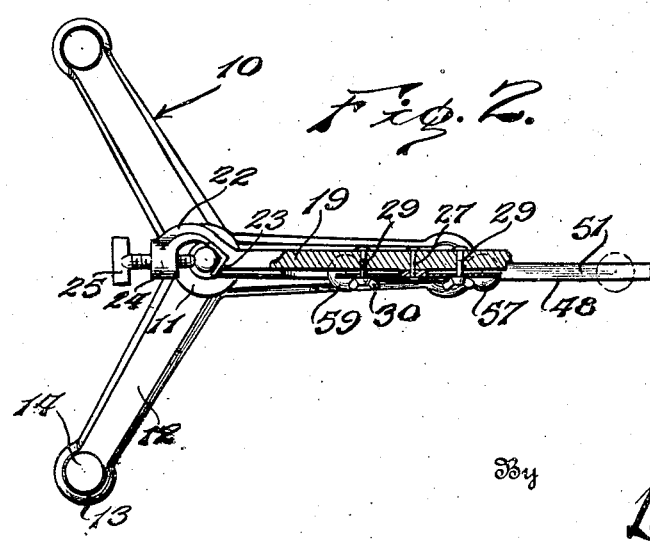
Inventor
G. C. Strouse
By Lacey & Lacey, Attorneys Patented Jan. 15, 1924.

1,481,075

UNITED STATES PATENT OFFICE.

GEORGE C. STROUSE, OF SEBRING, OHIO.

PENDULUM-DEMONSTRATING APPARATUS.

Application filed March 14, 1923. Serial No. 625,063.

*To all whom it may concern:*

Be it known that I, GEORGE C. STROUSE, a citizen of the United States, residing at Sebring, in the county of Mahoning and State of Ohio, have invented certain new and useful Improvements in Pendulum-Demonstrating Apparatus, of which the following is a specification.

The present invention relates to an apparatus for demonstrating the movements of a pendulum and the laws governing the same, and the apparatus is principally intended for use in schools.

One object of the invention is to provide a stand or support to carry several pendulums and this stand being furnished with means for adjusting the pendulum length. For this purpose the stand is provided with a graduation and slidable arms so that the length of a pendulum can be quickly determined and adjusted.

In the accompanying drawing one embodiment of the invention is illustrated, and;

Figure 1 shows the apparatus in elevation and partly in section;

Figure 2 is a top plan view of Figure 1, partly in section;

Figure 3 is a top plan view and partial section of one of the supporting arms; and Figure 4 is a similar view of another supporting arm.

The pendulum demonstrating apparatus consists of a base in the form of a tripod 10, having a central hub 11, and each arm 12 of the tripod terminating with a threaded bearing 13 for thumb screws 14 forming the feet of the apparatus and with which it may be adjusted in the usual manner.

The central hub is also preferably threaded in order to receive the lower end 15 of the post or standard 16. The post 16 has preferably a shoulder 17 for drawing it up tightly in the hub 11 of the tripod.

The post 16 is furnished with a graduation 18 running from zero near its lower end to one thousand or more at its upper end. These graduations represent preferably millimeters by means of which the length of each pendulum is obtained.

Upon this post 16 a number of arms of different length are mounted to slide up and down, and secured in accordance with the desired length of the pendulum. The arm 19 shown at the top of the apparatus is the longest, the next arm 20 is shorter and the arm 21 is still shorter. The top arm 19, which is preferably of square cross section, has at one end a sideways open jaw 22 with a V-shaped bearing portion 23 at its inner end and a threaded boss 24 at its outer end. This boss is adapted to receive a thumb screw 25 which is placed in axial alinement with the axis of the arm 19 and opposite the portion 23. The latter is extended above and below the arm so as to provide a long bearing against the post 16 in order to firmly hold the arm horizontally when the thumb screw 25 is drawn up on the opposite side thereof, as clearly seen in Figure 1.

About midway between the ends of the arm 19 is secured a spring plate 26 by means of a rivet 27 and resting with its raised portion 28 on the arm, so as to be slightly spaced from one side thereof. The two ends of the spring plate 26 are thus free and are each engaged by means of a set screw 29 with a wing nut 30 in order to be drawn up tightly against the side of the arm 19.

The free end of the arm is similarly provided with a spring plate 31 also secured by a rivet 32 with its raised portion 33 on the arm 19, so as to be spaced as at 34 at the outer end thereof. A set screw 35 with a wing nut 36 is likewise provided for this spring plate 31, as already described. The spaces between the spring plates and the arm have to be well dressed off and smooth for a purpose that will be described further on.

The arms 20 and 21 are similarly constructed, although the body portions 65 thereof are preferably of cylindrical section, while the outer ends 66 are of square section and furnished with the same clamping devices 37 and 38 as has been described with regard to the long arm 19. However, in this case such a clamp is provided only at the extreme end of each of the arms 20 and 21.

These two shorter arms 20 and 21 are also furnished with jaws 39 and 40 and thumb screws 41 and 42 respectively for securing the arms on the post 16. Level with the bottom edge of the clamps 26, 31, 37 and 38 respectively of the arms are shown index marks 43, 44 and 45 respectively upon the corresponding portion 23. By means of these index marks the position of the arms on the post 16 is determined.

In the space behind each of the clamping plates is intended to be inserted a string 46 carrying a bob 47 together constituting the actual pendulum. The string is of very light material such as does not stretch and would preferably consist of a silk fish line, the weight of which would be negligible and the bob 47 is preferably spherical. In Figure 1 three of these bobs 47, 57 and 59, and strings 46, 56 and 58 have been shown as suspended from the long arm 19 and each bob should be made of different material than the others, so that they would be of different weight and suitable material for this purpose would be lead, iron and aluminum.

Slightly raised above the tripod 10 is furnished a fourth arm 48 having a jaw 49 with a thumb screw 50. This arm 48 is also made of cylindrical material but its outer end is machined down to half round so as to furnish a flat upper surface as at 51. The jaw 49 has also an elongated V-shaped bearing portion 52 adapted to rest against the side of the post 16 when clamped in position. These V-shaped bearing portions 23 and 52 must all be very accurately made in order that each of the arms may stand at right angles from the post 16 when secured in position by their respective thumb screws. The top face of the V-shaped bearing 52 constitutes a reading line for the graduation 18 on the post and this face is accurately spaced above the flat face 51 of the arm 48, so as to correspond with the center of gravity of each bob 47. In this manner reading from the line 53 to the index marks 43, 44 and 45 represents the theoretic length of each pendulum. The reading line 53 is preferably positioned against the zero line of the graduation, so as to give a direct reading from the same to each of the arms.

The apparatus is used in the following manner: The tripod is placed on a stand or table in approximately upright position and the arm 48 is then clamped to the post 16 with its reading line registering with the zero mark of the graduation. The long arm 19 is then secured at any desired point, as for instance, on the 900 millimeter mark on the post and in substantially the same vertical plane as the bottom arm 48. The three pendulums are then attached to the long arm 19, each with its own clamp and at approximately the same distance apart, as indicated in Figure 1. Care must then be taken that the bob of each pendulum bearing touches the flat surface 51 of the arm 48. The apparatus is now leveled by adjusting the thumb screw 14 in the tripod in the usual manner and by aids of the pendulum bobs 47, 57 and 59.

The lower arm 48 is now loosened so as to slip down on the post or to be detached entirely therefrom when the three pendulums will be able to oscillate freely from the arm 19. If now the three pendulums are started simultaneously to oscillate through a small arc of not over three degrees, they will then continue to swing synchronously side by side. As the three bobs 47, 57 and 59 are made of material of different density, the law has then been proved that.

"The period of a pendulum is independent of the weight or material of the bob."

The next test consists in permitting the pendulums to oscillate simultaneously, but each through a different arc. All will then keep time, that is to say, they will oscillate at the same rate, which proves that, "The period of a pendulum swinging through a short arc is independent of the amplitude of the arc."

Next, the other two arms 20 and 21 are clamped to the post 16 in the same vertical plane as the long arm 19 and the middle arm 20 secured for instance at 225 millimeters, while the short arm 21 is secured at 100 millimeters along the graduation 18. The middle pendulum 56 and 57 is then secured by means of the clamp 37 to the arm 20, while the innermost pendulum 58 and 59 is similarly secured by the clamp 38 to the short arm 21. In this manner three pendulums of different lengths are provided corresponding to the ratio 900, 225 and 100, or, in other words, the shortest pendulum is one-ninth of the longest one, while the middle pendulum is one-fourth thereof.

If now the three pendulums are started simultaneously, the short pendulum will make three oscillations, the middle pendulum two oscillations, while the outermost or longest pendulum will make one oscillation. In this manner has then been proved that, "The periods of pendulums are directly proportional to the square roots of their lengths."

By placing a magnet under the iron pendulum it may also be proved that,

"The period of a pendulum decreases as the force of gravity increases."

In order to obtain a pendulum that gives oscillations of a duration of a second of time, the arm from which it is suspended should be clamped on the post 16 at the 993 millimeter mark. This will then give a half oscillation of one second, that is to say, an oscillation from the perpendicular to its turning point.

It is evident that the number of the horizontal arms and number of pendulums suspended therefrom is not limited to three, but may be multiplied when so desired.

It might here be noted that when using this apparatus a stop watch is unnecessary.

Having thus described the invention what is claimed as new is:

1. A pendulum demonstrating apparatus comprising a vertically positioned post, an arm slidably mounted upon said post and adjustable at different heights thereon, a pendulum including a bob and a line suspended from said arm, a transverse bar carried by the post and provided with a contacting surface for said bob, means for securing said arm and said bar in a horizontal plane on said post; said means including a V-shaped bearing portion on said arm adapted to engage with the side of said post, a thumb screw for tightening the bearing portion thereon, and indices on said arm and said bar, one of said indices coinciding with the suspension point and the other of said indices coinciding with the center of gravity of said bob.

2. A pendulum demonstrating device comprising a vertically positioned post, a plurality of arms, clamps adapted to secure said arms in selective horizontal planes on said post, a pendulum consisting of a bob on a string suspended from each of said arms, and a horizontal bar upon said post, the distance of said arms from said bar determining the respective pendulum lengths, when the bobs contact with said horizontal bar.

3. A pendulum demonstrating device comprising a vertically positioned post, pendulums each including a bob and a line, an arm for each of said pendulums adapted to hold the latter suspended, a transverse bar carried by said post and provided with a contacting surface for said bobs, an index on said bar coinciding with the centers of gravity of said bobs and other indices on said arms coinciding with the suspension points for the pendulums; whereby the distances between said first index and the respective other indices represent the theoretical lengths of the respective pendulums.

4. A pendulum demonstrating device comprising a tripod, adjusting screws for levelling the tripod, a post carried by the tripod and provided with suitable graduation along its side, a plurality of arms adjustably mounted in longitudinal direction upon said post, clamps on said arms, a pendulum consisting of a bob on a string secured in each of said clamps, a levelling arm upon said post adjacent to said tripod for said pendulum, a jaw on each of said arms adapted to engage with said post, and a thumb screw for tightening the jaw against the same, each of said jaws having an index mark for said graduation, said index mark indicating the mathematical suspension point of the pendulum.

In testimony whereof I affix my signature.

GEORGE C. STROUSE. [L. S.]